(12) United States Patent
Plowman

(10) Patent No.: US 11,117,630 B2
(45) Date of Patent: Sep. 14, 2021

(54) TRAILER ENCLOSURE

(71) Applicant: Jeffery Douglas Plowman, Willmar, MN (US)

(72) Inventor: Jeffery Douglas Plowman, Willmar, MN (US)

( * ) Notice: Subject to any disclaimer, the term of this patent is extended or adjusted under 35 U.S.C. 154(b) by 35 days.

(21) Appl. No.: 16/591,015

(22) Filed: Oct. 2, 2019

(65) Prior Publication Data

US 2020/0108880 A1    Apr. 9, 2020

Related U.S. Application Data

(60) Provisional application No. 62/741,296, filed on Oct. 4, 2018.

(51) Int. Cl.
*B62D 63/06* (2006.01)
(52) U.S. Cl.
CPC .................................. *B62D 63/061* (2013.01)
(58) Field of Classification Search
CPC .... B62D 63/061; B62D 63/00; B62D 63/025; B62D 63/04
See application file for complete search history.

(56) References Cited

U.S. PATENT DOCUMENTS

| | | | | |
|---|---|---|---|---|
| 3,482,041 A * | 12/1969 | Szeremy | ................... | H04N 5/53 348/528 |
| 3,495,866 A * | 2/1970 | Bontrager | ............... | B60P 3/341 296/26.05 |
| 4,448,453 A * | 5/1984 | Irelan | ........................ | B60P 3/34 296/156 |
| 4,603,901 A * | 8/1986 | McIntosh | ................... | B60P 3/34 296/165 |
| 5,135,278 A * | 8/1992 | Kauffman | ................. | B60P 3/34 296/170 |
| 5,951,096 A * | 9/1999 | Steury | ....................... | B60P 3/34 296/171 |
| 7,758,103 B1 * | 7/2010 | Steury | ....................... | B60P 3/34 296/156 |
| D695,675 S * | 12/2013 | Voglmayr | .................... | D12/414 |
| 10,160,299 B2 * | 12/2018 | Molinar Olivas | ..... | B60J 7/1614 |

* cited by examiner

*Primary Examiner* — James A Shriver, II
*Assistant Examiner* — James J Triggs
(74) *Attorney, Agent, or Firm* — Richard Arrett

(57) ABSTRACT

A trailer enclosure which is very easy to load and unload, by providing a trailer platform, with an enclosure which has a closed position and a raised position, and which is raised and lowered by a lift mechanism connected to the enclosure which raises the enclosure to the raised position, and can also lower the enclosure to its closed position.

10 Claims, 7 Drawing Sheets

TRAILER ENCLOSURE

CROSS-REFERENCE TO RELATED APPLICATIONS

This application claims priority to provisional patent application No. 62/741,296, filed Oct. 4, 2018, the entire contents of which is hereby incorporated by reference.

STATEMENT REGARDING FEDERALLY SPONSORED RESEARCH

Not Applicable.

BACKGROUND OF THE INVENTION

The invention relates to an inventive trailer enclosure, and more particularly a method to raise and lower the trailer enclosure, for ease of loading and unloading the trailer.

Prior art trailer enclosures are hard to use and make it very difficult to load and unload the trailer. The inventive trailer enclosure provides a trailer enclosure which is not hinged at one end, but which allows the entire trailer enclosure to raise for ease of loading and unloading.

Without limiting the scope of the invention a brief summary of some of the claimed embodiments of the invention is set forth below. Additional details of the summarized embodiments of the invention and/or additional embodiments of the invention may be found in the Detailed Description of the Invention, below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

The invention provides a trailer enclosure which is very easy to load and unload, by providing a trailer platform, with an enclosure which has a closed position and a raised position, and which is raised and lowered by a lift mechanism connected to the enclosure which raises the enclosure to the raised position, and can lower the enclosure to its closed position.

The lift mechanism is powered by turning a sprocket, which turns a chain that is connected by sprockets to four screws positioned on the four corners of the trailer. As the motor sprocket at the front center of the trailer is rotated, the chain turns the sprockets mounted on the ball screws, lifting the trailer enclosure to its upright position. To lower the trailer enclosure, the sprockets are simply rotated the opposite direction. Power can either be provided by a battery or from a vehicle via the trailer wire harness.

Alternatively, the lift mechanism can be operated by a hand operated crank, which turns the sprocket in either direction, to raise or lower the trailer mechanism.

DETAILED DESCRIPTION OF THE INVENTION

Figure 1:
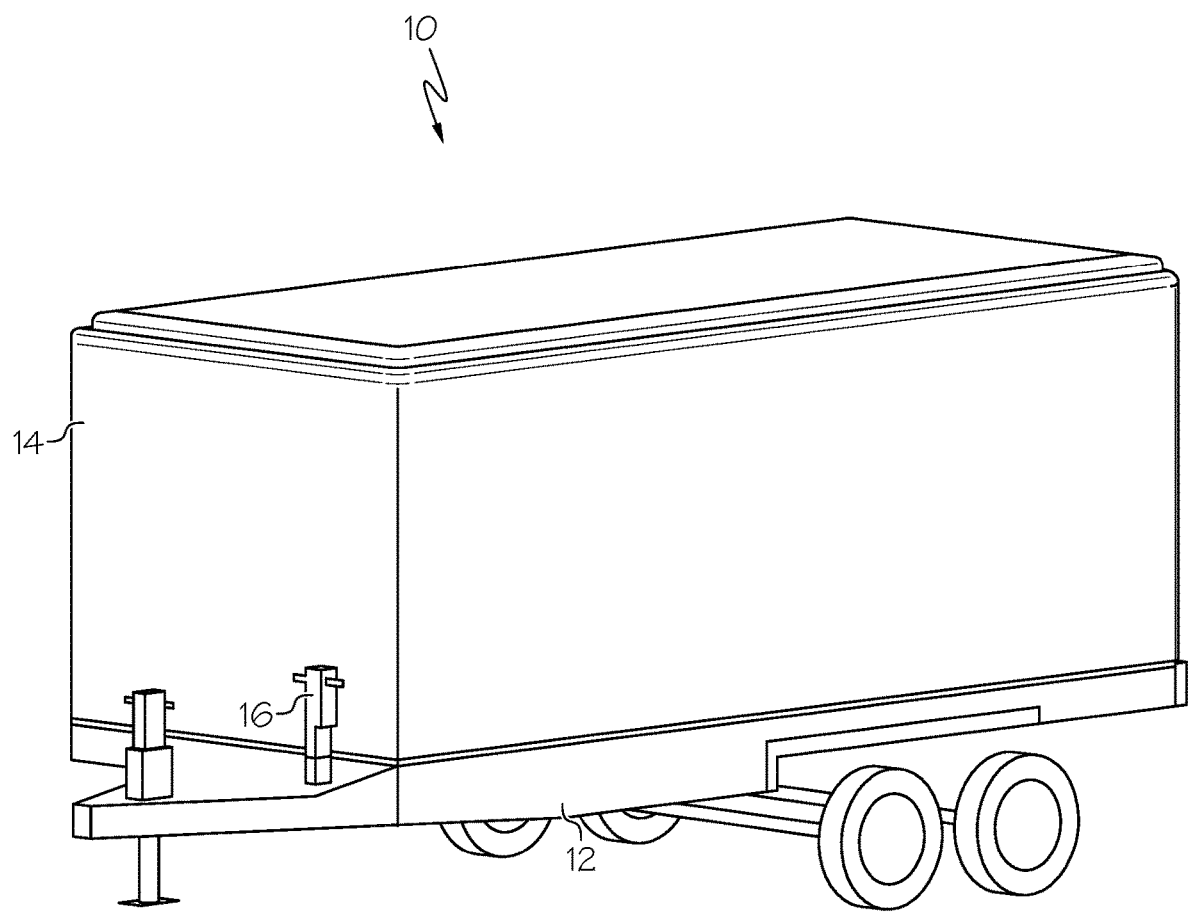
FIG. 1 shows a schematic view of the inventive trailer enclosure, in the closed position.
Figure 2:
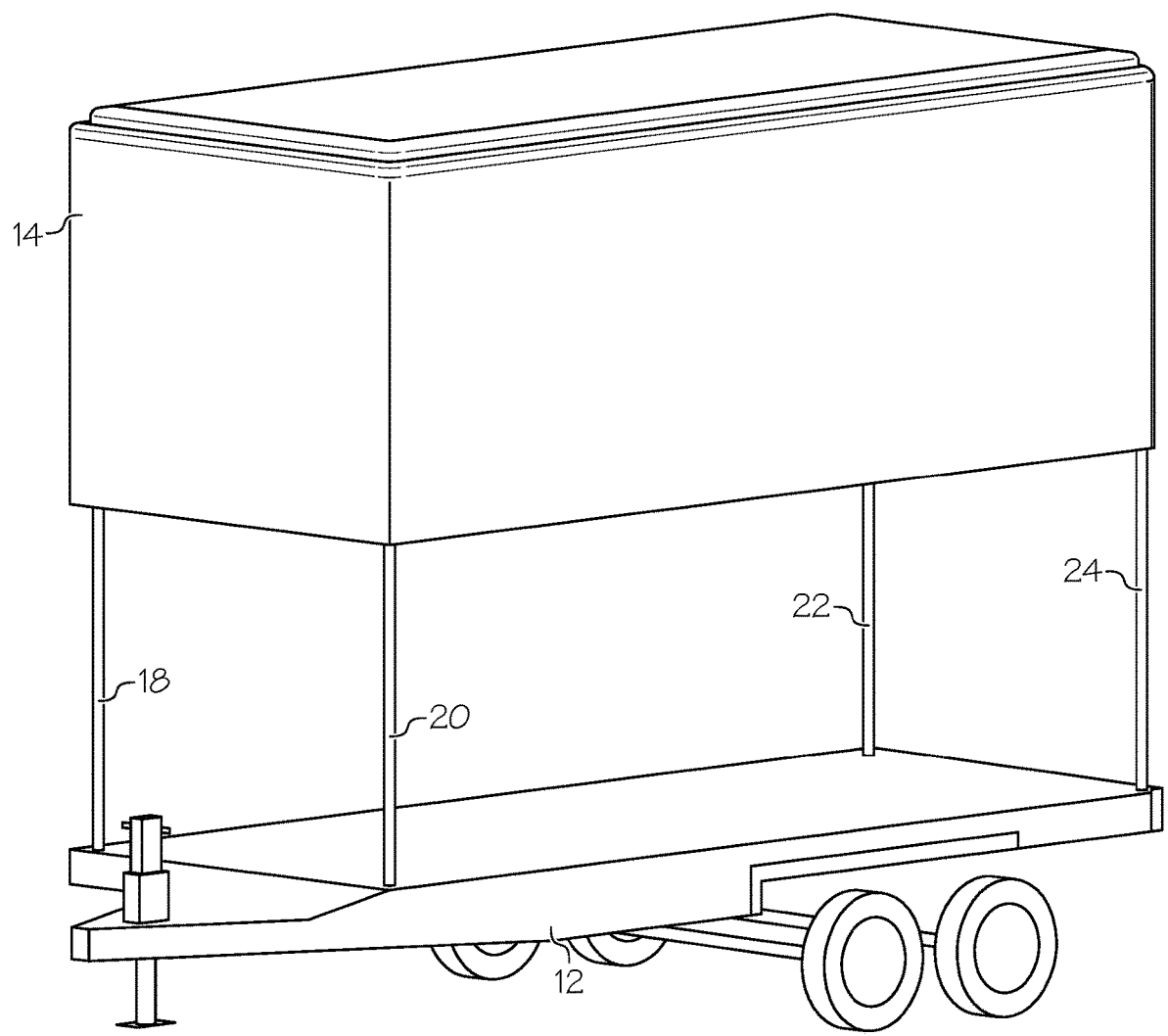
FIG. 2 shows a schematic view of the inventive trailer enclosure, in the open position.

A trailer enclosure is shown in FIGS. 1 and 2 below. The trailer is shown generally at 10, with a trailer platform 12 and a trailer enclosure 14. A jack for parking the trailer is shown at 16. The enclosure can lock down using one or two latches (not shown). The enclosure can be lifted to the position shown in FIG. 2 a lift mechanism (best seen in FIG. 6 at 30) mounted on a trailer bed that simultaneously raises and lowers the four sides and top of an enclosed trailer. The lift mechanism could be ball screws as depicted in FIG. 2, pneumatic cylinders, gear rack, ACME Screw or a scissor method. The lift mechanism makes it easy to load and unload the trailer. The lift mechanism can either be manually powered, by a person turning the lift mechanism, or power could be provided by a motor that operates the lift by drawing current from a battery or from the vehicle the trailer is attached to, via the standard wiring harness.

Figure 6:
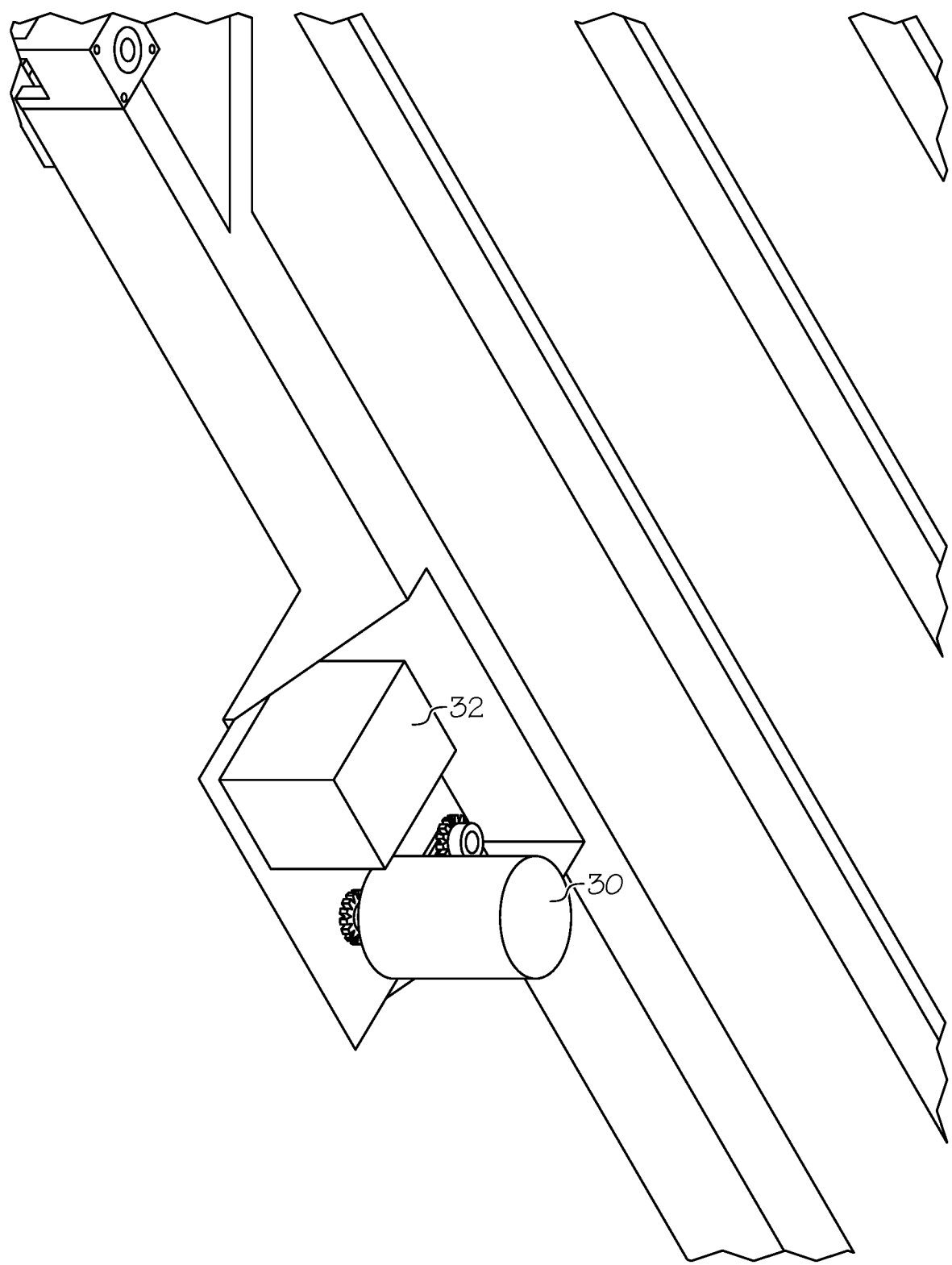
FIG. 6 shows a view of the lifting mechanism, which drives the four ball screws that are used to lift the trailer enclosure.

In FIG. 2, the four corners have ball screws 18, 20, 22, and 24, which are turned by motor and sprocket assembly depicted in FIG. 6, item 30, to raise the enclosure 14. The drive chain runs inside of the 2"×6" metal tubes that make up the frame, and is only shown for the front two ball screws.

A closer view of one of the four ball screws shown in FIG. 2 is shown below in FIG. 3.

Figure 4:
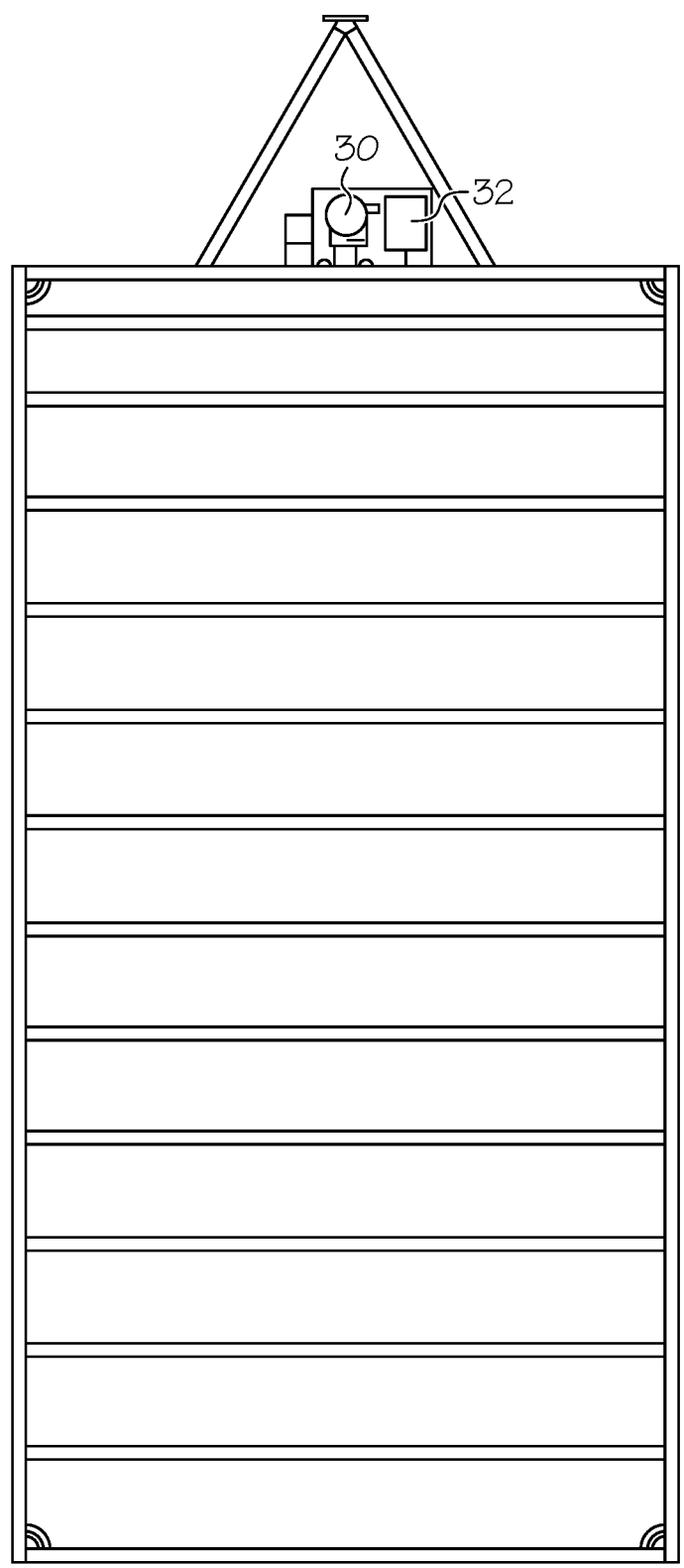
FIG. 4 shows a top cross-sectional view of the inventive trailer enclosure.
Figure 5:
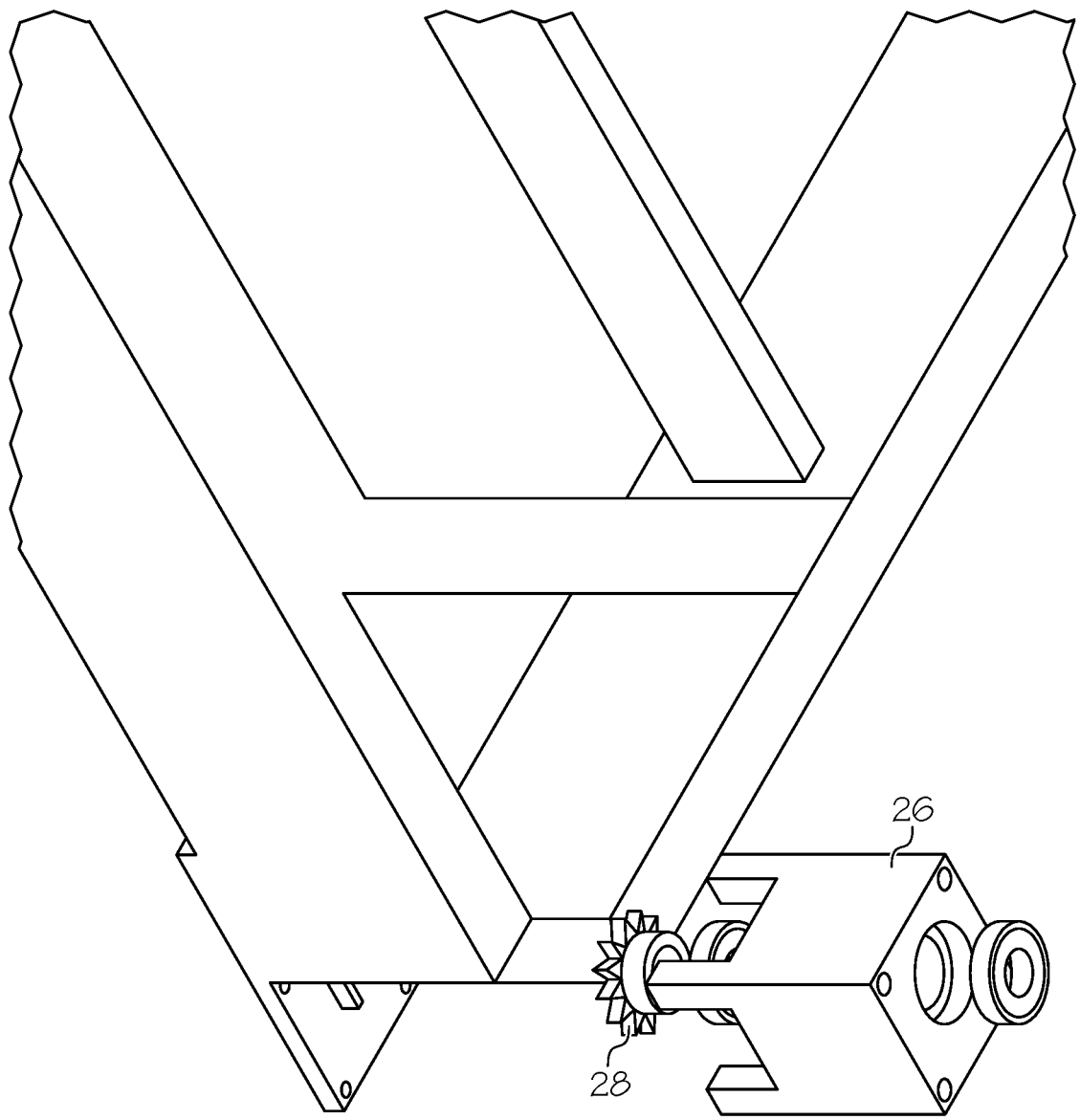
FIG. 5 shows a view of a mounting block for the ball screw.
Figure 7:
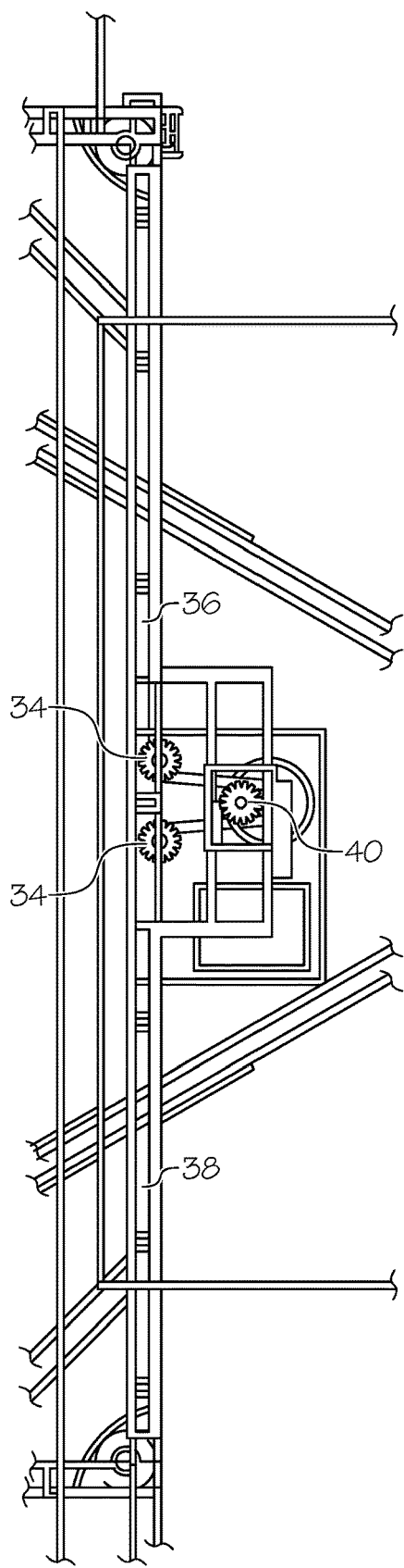
FIG. 7 shows a top view of the lift mechanism, sprockets and chain used to turn the ball screws to raise and lower the trailer enclosure.

Referring now to FIGS. 4, 5, 6 and 7 (FIG. 7 is an enlarged view of the front of FIG. 4, the lift mechanism is shown in more detail. The motor 30 is used to drive a chain shown at 36 and 38 in FIG. 7. The chain forms a loop which extends around the trailer, and engages the sprockets 28 at each corner, as well as the motor sprocket 40. As the motor causes the chain to move in one direction, the sprockets 28 cause the ball screws 18, 20, 22 and 24 to rotate, causing the enclosure 14 to lift. Reversing the direction of the chain lowers the enclosure 14.

Figure 3:
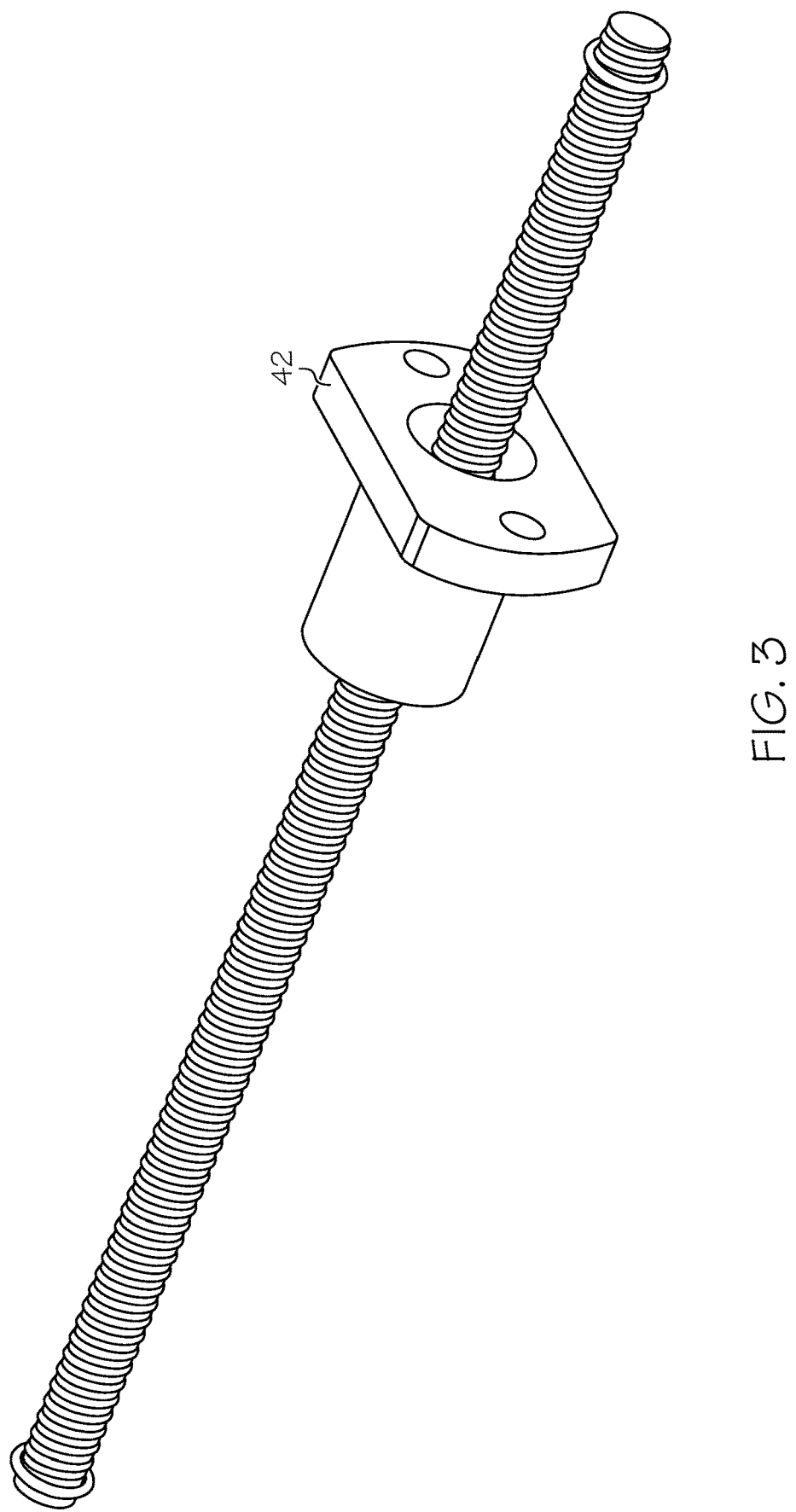
FIG. 3 shows an exemplary ball screw, which is used to lift the trailer enclosure.

The brackets 42, best seen in FIG. 3, is connected to the enclosure 14, and as the ball screws 18, 20, 22 and 24 rotate, the brackets 42 move up or down, depending on the direction the chain is moving, to raise or lower the enclosure 14. Sprockets 34, shown in FIG. 7, cause the chain (36 and 38) to turn 90 degrees and then wrap around the motor sprocket 40.

Power for the motor 30 can either be provided by battery 32, or can be provided by the vehicle battery via the trailer wire harness.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A trailer enclosure comprising:
   a trailer platform;
   an enclosure which has a closed position and a raised position;
   a motorized lift mechanism connected to the enclosure which raises the enclosure to the raised position, the motorized lift mechanism drives at least two ball screws, each ball screw driving a bracket connected to the enclosure, up or down as the ball screw rotates.

2. A trailer enclosure comprising:
   a trailer platform;
   an enclosure which has a closed position and a raised position;
   a lift mechanism connected to the enclosure which raises the enclosure to the raised position, and wherein the lift mechanism is comprised of a motor which drives four ball screws, by driving a chain extending around the trailer platform, the chain causing a sprocket engaged with each ball screw to rotate, which causes each ball screw to rotate, each ball screw driving a bracket, connected to the enclosure, up or down as the ball screw rotates.

3. The trailer enclosure of claim 2 wherein the motor drives the chain in a first direction to rotate the four ball screws in a first direct to raise the enclosure to the raised position.

4. The trailer enclosure of claim 2 wherein the motor drives the chain in a second direction to rotate the four ball screws in a second direct to lower the enclosure to the closed position.

5. The trailer enclosure of claim 4 further including latches which lock the enclosure in the closed position.

6. The trailer enclosure of claim 2 further including a power source to operate the lift mechanism.

7. The trailer enclosure of claim 6 wherein the power source is a battery.

8. The trailer enclosure of claim 6 wherein the power source is a vehicle the trailer is electrically connected to.

9. The trailer enclosure of claim 7 wherein the power source is manually turning a motor sprocket to move the chain to lift or lower the enclosure.

10. A trailer enclosure comprising:
    a trailer platform;
    an enclosure which has a closed position and a raised position;
    a manually powered lift mechanism connected to the enclosure which raises the enclosure to the raised position, the manually powered lift mechanism drives at least two ball screws, each ball screw driving a bracket connected to the enclosure, up or down as the ball screw rotates.

\* \* \* \* \*